United States Patent
Stevens

(10) Patent No.: US 7,363,104 B2
(45) Date of Patent: Apr. 22, 2008

(54) PRODUCT STORAGE AND PICKING SYSTEM AND METHOD OF STORING AND PICKING PRODUCTS

(75) Inventor: Criston S. Stevens, Layton, UT (US)

(73) Assignee: SK Daifuku Corporation, Salt Lake City, UT (US)

(*) Notice: Subject to any disclaimer, the term of this patent is extended or adjusted under 35 U.S.C. 154(b) by 546 days.

(21) Appl. No.: 10/641,809

(22) Filed: Aug. 15, 2003

(65) Prior Publication Data

US 2005/0035694 A1    Feb. 17, 2005

(51) Int. Cl.
*G06F 7/00*    (2006.01)

(52) U.S. Cl. ................... 700/213; 700/216

(58) Field of Classification Search ............ 700/213, 700/216, 242, 243; 414/331.01, 331.02, 414/331.06; 211/1.51, 1.52, 162, 163
See application file for complete search history.

(56) References Cited

U.S. PATENT DOCUMENTS

| | | | |
|---|---|---|---|
| 3,730,358 A | 5/1973 | Oji | |
| 3,780,852 A | 12/1973 | Weiss et al. | |
| 3,865,446 A | 2/1975 | Mastronardi | |
| 4,232,988 A | 11/1980 | Kochanneck | |
| 4,307,922 A | 12/1981 | Rhodes, Jr. | |
| 4,574,962 A | 3/1986 | Tabler et al. | |
| 4,643,495 A * | 2/1987 | Pepping et al. | 312/268 |
| 5,062,242 A * | 11/1991 | Corcoran | 52/36.1 |
| 5,065,872 A * | 11/1991 | Simon | 211/122 |
| 5,207,335 A | 5/1993 | Voelz | |
| 5,333,983 A * | 8/1994 | Hatouchi et al. | 414/331.06 |
| 5,405,193 A * | 4/1995 | Herrenbruck | 312/118 |
| 5,505,586 A * | 4/1996 | Lichti | 414/800 |
| 5,636,750 A | 6/1997 | Heyl | |
| 5,651,469 A | 7/1997 | Lodge | |
| 5,683,155 A * | 11/1997 | Sarno | 312/201 |
| 5,835,265 A * | 11/1998 | Mammone | 359/383 |
| 6,190,117 B1 | 2/2001 | Lichti | |
| 6,347,713 B1 | 2/2002 | Piazza | |
| 6,464,142 B1 * | 10/2002 | Denenberg et al. | 235/462.46 |
| 6,626,306 B1 * | 9/2003 | Bell | 211/144 |
| 6,694,217 B2 * | 2/2004 | Bloom | 700/215 |
| 6,728,597 B2 * | 4/2004 | Didriksen et al. | 700/243 |
| 7,010,389 B2 * | 3/2006 | Lunak et al. | 700/243 |

FOREIGN PATENT DOCUMENTS

| | | |
|---|---|---|
| EP | 0 847 944 A2 | 6/1998 |
| JP | 2001206504 | 7/2001 |
| WO | WO 02/059021 A1 | 8/2002 |

* cited by examiner

*Primary Examiner*—Gene O. Crawford
*Assistant Examiner*—Ramya G. Prakasam
(74) *Attorney, Agent, or Firm*—Wood, Phillips, Katz, Clark & Mortimer

(57) ABSTRACT

A product storage and picking system having a plurality of shelves each with a front, a rear, a top, a bottom and spaced sides. The plurality of shelf units are arranged in first and second side-by-side rows with the shelf units in each of the first and second rows arranged in front-to-rear relationship. A plurality of shelf units are movable guidingly in a cycle to selectively place each of the shelf units serially at a pick position so that product on the shelf unit at the pick position can be removed to fill an order. At least one of the shelf units is movable in a predetermined manner during a portion of the cycle without moving other shelf units in the plurality of shelf units.

22 Claims, 12 Drawing Sheets

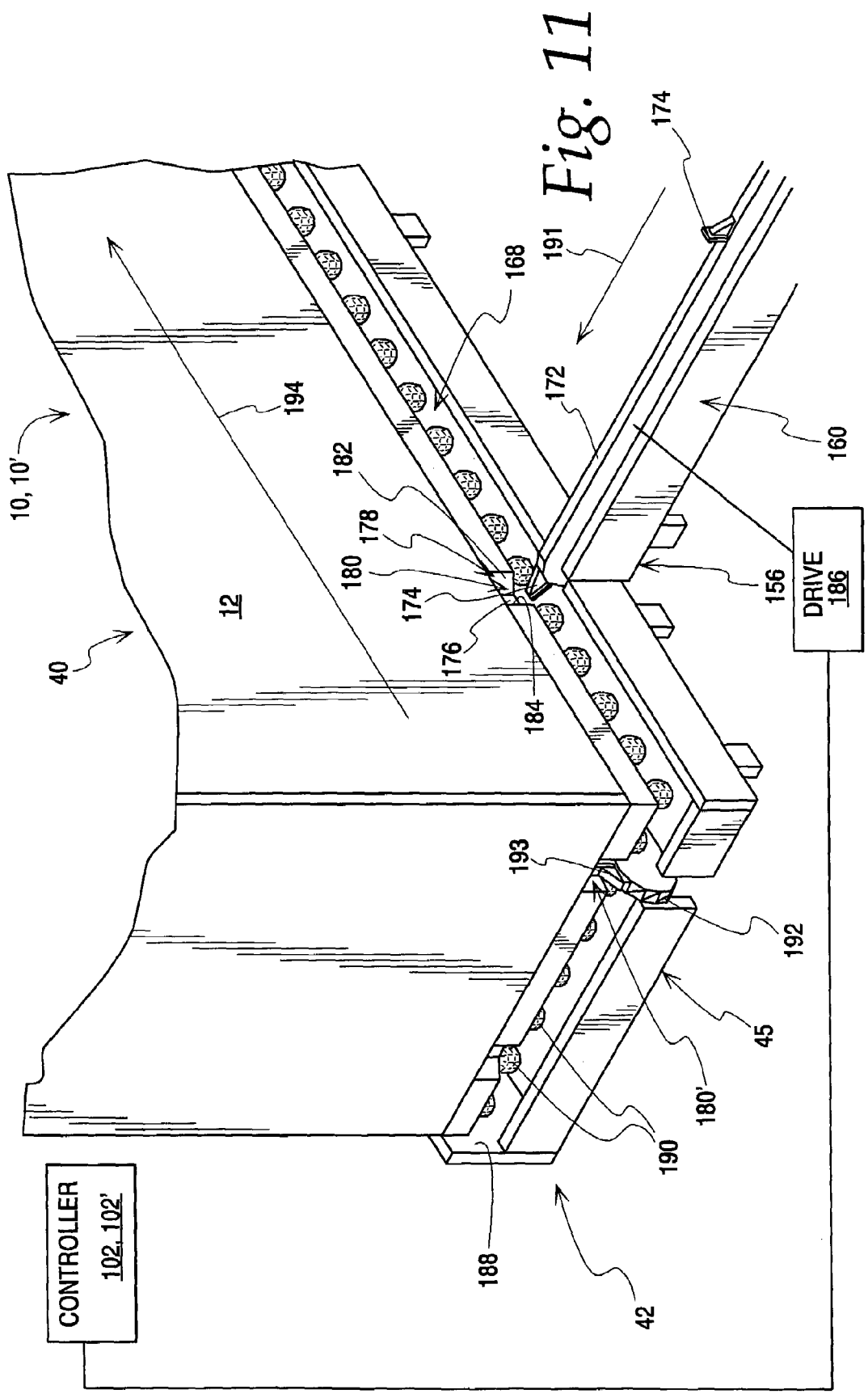

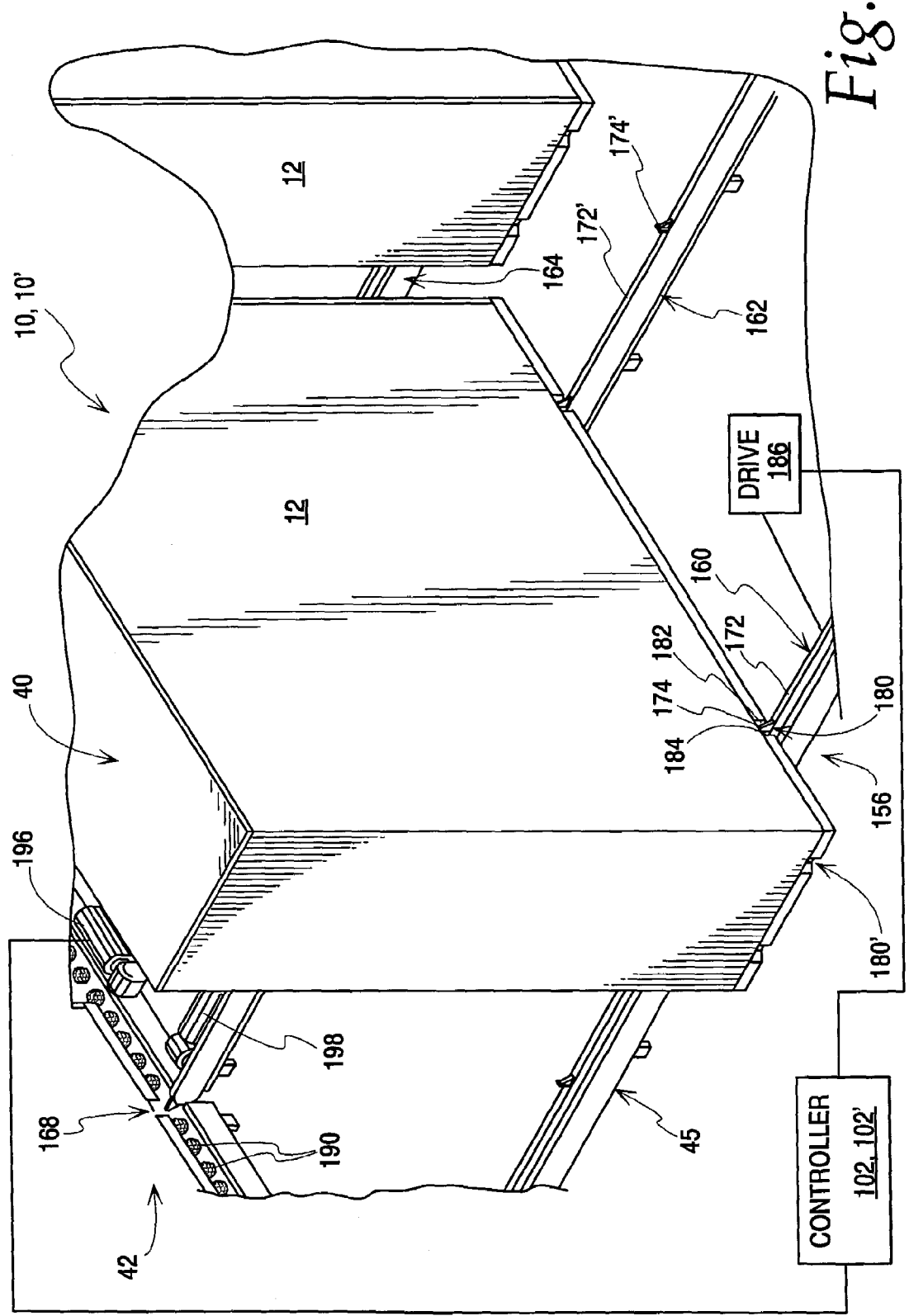

PRODUCT STORAGE AND PICKING SYSTEM AND METHOD OF STORING AND PICKING PRODUCTS

BACKGROUND OF THE INVENTION

1. Field of the Invention

This invention relates to systems for storing discrete products and which facilitate single order and/or batch picking. The invention is also directed to a method of storing and picking such products.

2. Background Art

Myriad systems currently exist for the bulk storage of products that are picked to fill individual orders. Designers of these systems strive to make these systems space efficient, while at the same time facilitating manual and automated product picking.

In most operations in which these systems are utilized, space is at a premium. Oft times, the systems are designed so that product carrying shelf units are arranged to define aisles through which operators maneuver to access the contents on the various shelves. The operator may strategically traverse a path through the aisles, with or without a cart, and progressively pick products required to fill orders. Products may be placed in totes or other containers as this process is carried out. While the aisleways afford an access route for the operators, they take up space that might otherwise be utilized for additional storage. Inefficient space utilization translates into increased rental, maintenance costs, and costs associated with maintaining a desired environmental state within a larger than necessary volume.

In the above type of systems, the network of aisleways may also create potential interference between multiple operators picking products from the same groups of shelves. Absent an effective method of coordination, employee time may be wasted as the picking process is carried out.

A further problem with the above type of systems is that the product in the potentially numerous shelves remains exposed to potential thieves as well as legitimate pickers. In large operations, it may be virtually impossible to identify thieves in a large group of operators performing their assigned duties within the system.

A still further problem with the above type of systems is that they tend to have an inherent inefficiency by reason of the potentially great distances that must be traversed by operators during the picking operations. Operators may have to walk, and move carts, over significant distances to complete an order, and potentially even between successive picks. Aside from inefficiency from a pure time standpoint, this contributes to operator fatigue, which potentially tacks on another level of inefficiency.

Problems are also contended with in the replenishment of the products on the various shelves using the above types of systems. In a separate operation, the operators will carry, on their person and/or in carts, products to be re-shelved for future picking. The same inefficiencies are encountered in terms of the potential distances between putaways of new product, operator fatigue, etc.

A still further problem encountered with these types of systems is that the putaway process is generally coordinated so that like stock keeping units (SKU's) are placed at the same location and not separated from each other at that location by putaway date. As a result, the SKU's become mingled and, absent some other detecting mechanism or procedure, even time sensitive product may not be able to be picked on a first-in-first-out basis.

Yet another problem with conventional storage systems is encountered when product is required to be stored in an environmentally controlled environment. For example, product may be stored at low temperatures in freezers and coolers, and at high temperatures in ovens, etc. With a conventional system layout, an operator may be required to move amongst the shelves during the picking process in a potentially harsh environment. While some steps can be taken to minimize the effects of this harsh environment, as through the use of special clothing and gloves, there still remain a number of problems. First of all, regardless of the clothing or accessories that are utilized, it may still remain uncomfortable for an operator to immerse him-/herself in especially hot, cold, or humid environments. Workers are susceptible to sicknesses as they subject themselves to drastically different environments as the pick process moves them in and out of the controlled environment. Even if the workers remain immersed in the controlled environment, depending upon the conditions therein, health issues may arise. Still further, working with extra clothing may impair the picking process. Additionally, all the previously mentioned problems and drawbacks associated with conventional shelving are contended with in this controlled environment.

SUMMARY OF THE INVENTION

In one form, the invention is directed to a product storage and picking system having a plurality of shelves each with a front, a rear, a top, a bottom and spaced sides. The plurality of shelf units are arranged in first and second side-by-side rows with the shelf units in each of the first and second rows arranged in front-to-rear relationship. A plurality of shelf units are movable guidingly in a cycle to selectively place each of the shelf units serially at a pick position so that product on the shelf unit at the pick position can be removed to fill an order. At least one of the shelf units is movable in a predetermined manner during a portion of the cycle without moving other shelf units in the plurality of shelf units.

In one form, the at least one shelf unit translates in a sideways linear path as the at least one shelf unit moves in the predetermined manner during the course of the cycle.

The system may further include a wall structure defining a space within which the plurality of shelf units reside, with their being an opening in the wall structure at the pick position communicating to externally of the space.

The space within the wall structure may be environmentally controlled.

In one form, the plurality of shelf units have flat sides and flat sides on shelf units in the first row reside in adjacent parallel relationship to flat sides on shelf units in the second row.

The plurality of shelf units may be arranged so that there is at least one open position into which a shelf unit can shift during the cycle.

In one form, a single shelf unit is shifted sideways into the one open position during the cycle.

In another form, all of the shelf units in the first row are shifted in one of a) a rear-to-front and b) a front-to-rear direction to thereby move a shelf unit into the one open position during the cycle.

In one form, the system includes a dog that is moved by an endless member for engaging the single shelf unit and shifting the single shelf unit sideways into the open position.

The system may include a dog moved by an endless member for engaging one of the shelf units in the first row and shifting all of the shelf units in the first row to thereby move a shelf unit into the one open position during the cycle.

The system may further include at least a first rail for guiding movement of the shelf units in the first row in a substantially linear path and at least a second rail for guiding movement of the shelf units in the second row in a substantially linear second path that is substantially parallel to the first path.

The system may further include a plurality of ball bearings which guide shifting of the single shelf unit sideways from one of the first and second rows into the other of the first and second rows.

The system may further include a drive system with a plurality of drive assemblies and a control system for coordinatingly operating the drive assemblies to cause the shelf units to move in the cycle.

In one form, the plurality of shelf units are arranged so that there is at least one open position into which a shelf unit can be positioned. The drive system has a) a first drive assembly that is operable to shift a single shelf unit from the first row sideways into the one open position in the second row, thereby creating an open position in the first row and b) a second drive assembly that is operable to shift the shelf units in the first row in one of a front-to-rear and rear-to-front direction to cause a shelf unit in the first row to move into the open position in the first row.

The system may further include a control system capable of receiving an order for product and processing the order for product by generating a pick list through which products in the order for product are serially identified to an operator at the shelf units at the pick position as the shelf units are moved during the cycle.

The plurality of shelf units may be arranged in a squared array as viewed from above.

In one form, the squared array is bounded by a squared edge including parallel side edge portions and parallel front and rear edge portions. The fronts and rears of the plurality of shelf units are flat and substantially parallel to the front and rear edge portions, and the sides of the plurality of shelf units are flat and substantially parallel to the side edge portions.

The system may further include a source of at least one of: a) cooled fluid; b) heated fluid; c) pressurized fluid; and d) humidity controlled fluid to environmentally control the space.

In one form, the wall structure closely surrounds the plurality of shelf units and blocks access to product on the shelf units at other than at least one discrete opening in the wall structure.

In another form, the invention is directed to a product storage and picking system having a plurality of shelf units each having a front, a rear, a top, a bottom and spaced sides. The wall structure bounds a space within which the plurality of shelf units reside. The wall structure blocks access to products in the shelf unit and has an opening. The plurality of shelf units are movable guidingly in a cycle to selectively place each of the shelf units serially at a pick position so that product on the shelf unit at the pick position can be accessed through the wall structure opening and removed to fill an order.

The system may further include a source of at least one of: a) cooled fluid; b) heated fluid; c) pressurized fluid; and d) humidity controlled fluid to environmentally control the space.

In one form, the wall structure closely surrounds the plurality of shelf units.

The system may further include a drive system with a plurality of drive assemblies and a control system for coordinatingly operating the drive assemblies to cause the shelf units to move in the cycle.

The plurality of shelf units may be arranged in a squared array as viewed from above.

In one form, the squared array is bounded by a squared edge including parallel side edge portions and parallel front and rear edge portions. The fronts and rears of the plurality of shelf units are flat and substantially parallel to the front and rear edge portions, with the sides of the plurality of shelf units being flat and substantially parallel to the side edge portions.

The product storage and picking system may further include a control system capable of receiving an order for product and processing the order for product by generating a pick list through which products on the order for product are serially identified to an operator at the shelf units at the pick position as the shelf units are moved during the cycle.

The invention is further directed to a method of storing and picking products. The method includes the steps of: providing a plurality of product carrying shelf units each having a front, a rear, a top, a bottom and spaced sides; moving the plurality of shelf units through cycles whereby each of the shelf units is serially placed at a pick position during a single cycle so that products carried by the shelf units at the pick position are accessible by an operator; generating a pick list corresponding to a first order; and identifying for an operator products on the pick list at each shelf unit at the pick position so that the operator can pick the product in the first order serially from the shelf units arriving at the pick position to an accumulation location as the plurality of shelf units are moved through a cycle.

The method may further include the steps of providing a wall structure around the plurality of shelf units so as to define a space within which the plurality of shelf units reside and controlling the environment within the space by selectively controlling at least one of: a) temperature; b) pressure; and c) humidity within the space.

The method may further include the step of providing an access opening through the wall structure so that products on the shelf units at the pick position are accessible by an operator through the wall structure opening without requiring the operator to be fully exposed to environmental conditions within the space.

The method may further include the step of replenishing product on the shelf units as the shelf units are moved through the cycle.

The method may further include the step of providing a control system capable of receiving an order for product and processing the order for product by generating a pick list through which products in the order for product are serially identified to an operator at the shelf units at the pick position as the shelf units are moved during a cycle.

In one form, the step of providing a control system involves providing a control system capable of generating a pick list through which products in the order for product are serially identified on the shelf units for an operator on a first-in-first-out basis.

The step of replenishing products may involve replenishing products in a random putaway manner.

The step of replenishing product may involve assigning a product code and a lot to a location at which replenished product is placed.

The step of moving the plurality of shelf units may involve moving the plurality of shelf units in an endless path through a stepwise linear movement of each of the shelf units.

In one form, the step of moving a plurality of shelf units involves moving the plurality of shelf units along only two orthogonal directional paths.

In one form, the step of providing a plurality of product carrying shelf units involves providing a plurality of product carrying shelf units each having a squared shape as viewed from above with flat, parallel sides and flat, parallel fronts and rears, and arranging the plurality of shelf units in a squared array with first and second rows of the product carrying shelf units. The sides of the product carrying shelf units in the first row are substantially parallel and adjacent to sides of the product carrying shelf units in the second row.

BRIEF DESCRIPTION OF THE DRAWINGS

FIG. 11 is an enlarged, fragmentary, perspective view of the support/drive mechanism in FIGS. 9 and 10 and showing one of the shelf units in a front, pick position; and FIG. 12 is a view similar to that in FIG. 11 with the shelf unit in the pick position moved rearwardly from the FIG. 11 position.

DETAILED DESCRIPTION OF THE DRAWINGS

Figure 1:
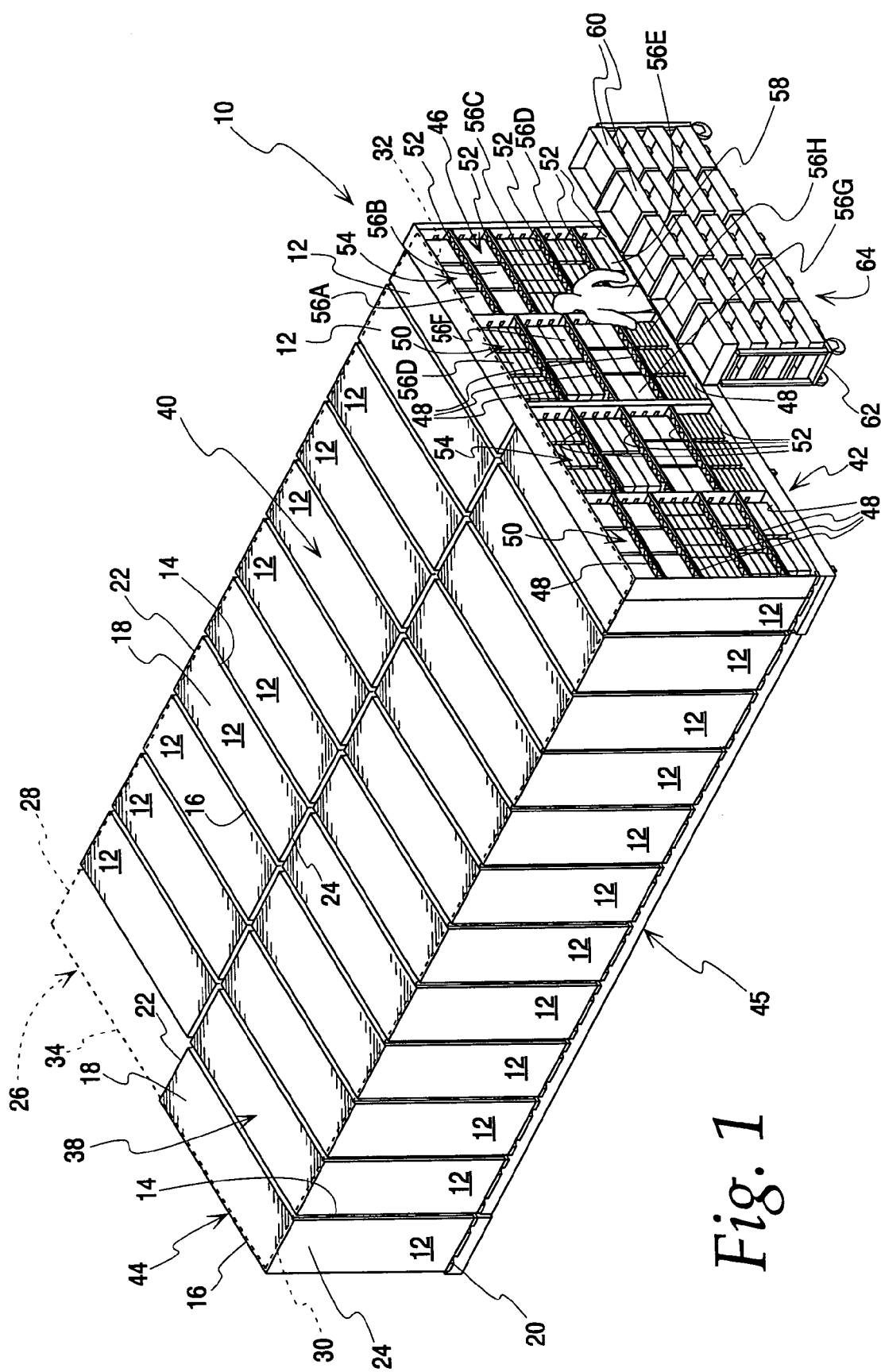
FIG. 1 is a perspective view of one form of product storage and picking system, according to the present invention, and including a plurality of independently movable shelf units.
Figure 2:
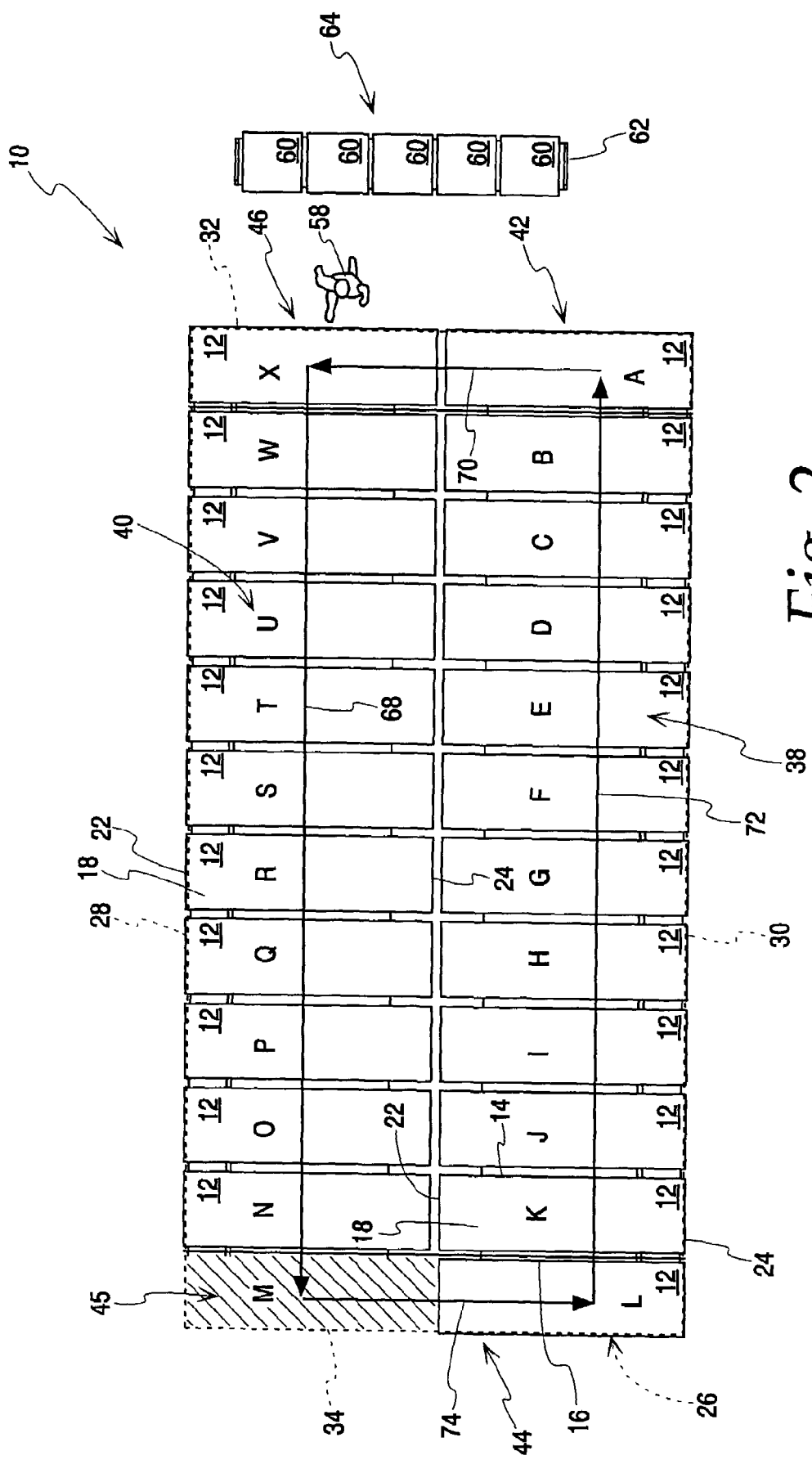
FIG. 2 is a plan view of the product storage and picking system of FIG. 1.

In FIGS. 1 and 2, one form of product storage and picking system, conventionally referred to as a shelf storage and picking system (SSPS), according the present invention, is shown at 10. The system 10 consists of a plurality of shelf units 12, each of a like construction. Each shelf unit 12 has a front 14, a rear 16, a top 18, a bottom 20, and spaced sides 22, 24. The fronts 14, rears 16, tops 18, bottoms 20, and sides 22, 24 each have a generally flat shape, with the planes of the fronts and rears 14, 16; tops and bottoms 18, 20; and sides 22, 24 residing in substantially parallel relationship. The planes of the tops and bottoms 18, 20 are substantially orthogonal to the planes of the fronts 14, rears 16, and sides 22, 24. The planes of the fronts and rears 14 16 are substantially orthogonal to the planes of the sides 22, 24. The plurality of shelf units 12 are arranged in a squared array, as viewed from above. The squared array is bounded by a squared edge 26, consisting of parallel side edge portions 28, 30 and parallel front and rear edge portions 32, 34, respectively. The planes of the sides 22, 24 are parallel to the side edge portions 28, 30, with the planes of the fronts and rears 14, 16 parallel to the front and rear edge portions 32, 34.

The shelf units 12 are arranged in first and second, side-by-side rows 38, 40, running parallel to the side edge portions between the front 42 and rear 44 of the system 10. In each row 38, 40, the shelf units 12 are aligned in front-to-rear relationship so that the sides 22 reside in a single plane and the sides 24 reside in a spaced, parallel plane. It should be noted that the inventive concept can be practiced with but a single shelf unit 12 in one of the rows 38, 40.

The shelf units 12 are mounted upon a support/drive mechanism 45, through a structure and in a manner as explained hereafter, to be movable guidingly in a cycle in which each of the shelf units 12 is serially placed at a pick position at 46 at which the front 14 of each shelf unit 12 is exposed. Each shelf unit 12 has a plurality of vertically spaced, horizontal shelves 48 in one column 50 and a plurality of vertically spaced, horizontal shelves 52 in a separate column 54. The number of horizontal shelves 48 in each column 50, 54, and the number of columns 50, 54 in each shelf unit 12, are design choices. Each horizontal shelf 48, 52 is capable of supporting product at a pick from location. In this embodiment, eight (8) different sizes/shapes of individual containers 56A, 56B, 56C, 56D, 56E, 56F, 56G, 56H, are shown placed on the horizontal shelves 48, 52 in a manner that products placed therewithin can be readily identified and picked by an operator 58 to totes/containers 60 stacked on a wheeled consolidated cart 62 at an accumulation location 64. The totes/containers 60 may each be identified for a single order. A single order may alternatively be assigned to two or more totes/containers The manner of storing product on the shelf units 12 is not important to the present invention. Open shelves, permanently formed bins, and/or containers as shown, but of different size and shape, could be utilized as an alternative to the containers 56A-56H shown. In the embodiment shown, the shelves 48, 52 are vertically repositionable to accommodate different sizes and numbers of containers 56A-56H.

The manner of repositioning the shelf units 12 will now be described with respect to FIG. 2 in a general sense before the details of the mechanism for permitting relative movement through a cycle are explained with respect to other Figures herein. In FIG. 2, the locations occupied, or occupyable, by a shelf unit 12 are identified as A-X, with the location X representing the location of the shelf unit 12 at the pick position 46. The M location is an open position. To begin the cycle, the shelf units 12 in the N-X locations are shifted in unison, from front to rear in the direction indicated by the arrow 68, so that the shelf unit 12 at the N location moves into the open position at the M location. This creates an open position at the X location. The shelf unit 12 at the A location is then shifted laterally/sideways in the direction of the arrow 70 to move into the open position at the X location. The shelf units at the B-L locations can then be shifted in unison forwardly in the direction of the arrow 72 to create an open position at the L location. The shelf unit 12 at the M location can then be shifted laterally/sideways without changing its orientation, in the direction of the arrow 74, to the open position at the L location to complete the cycle, which can then be repeated.

The above-described arrangement has a number of advantages. First of all, the shelf units 12 are compactly situated in the squared array so that there is potentially a very efficient space utilization. While more than one open position can be designed into the system 10, potentially only one open position is required and accounts for wasted storage space in the footprint for the array of shelf units 12.

By compactly arranging the shelf units 12 in a front-to-rear direction, the front 14 of each shelf unit 12, other than that at the pick position 46 at the X location, and that at the A location which represents an alternative pick position, is blocked by another shelf unit 12 so that its contents cannot be accessed. This prevents unauthorized removal of products from the shelves 12 other than from at the front 42, which is manned and thus readily observable by, the operator 58 and/or a supervisor. This minimizes the likelihood of unauthorized removal of product from the shelving units 12.

Additionally, by reason of the system configuration, the shelf units 12 are serially brought to the pick position 46, without requiring any significant movement by, or inconvenience to, the operator 58. The operator 58 is thus allowed a simple pick to tote movement to fill orders, as explained in greater detail hereinbelow.

Figure 3:
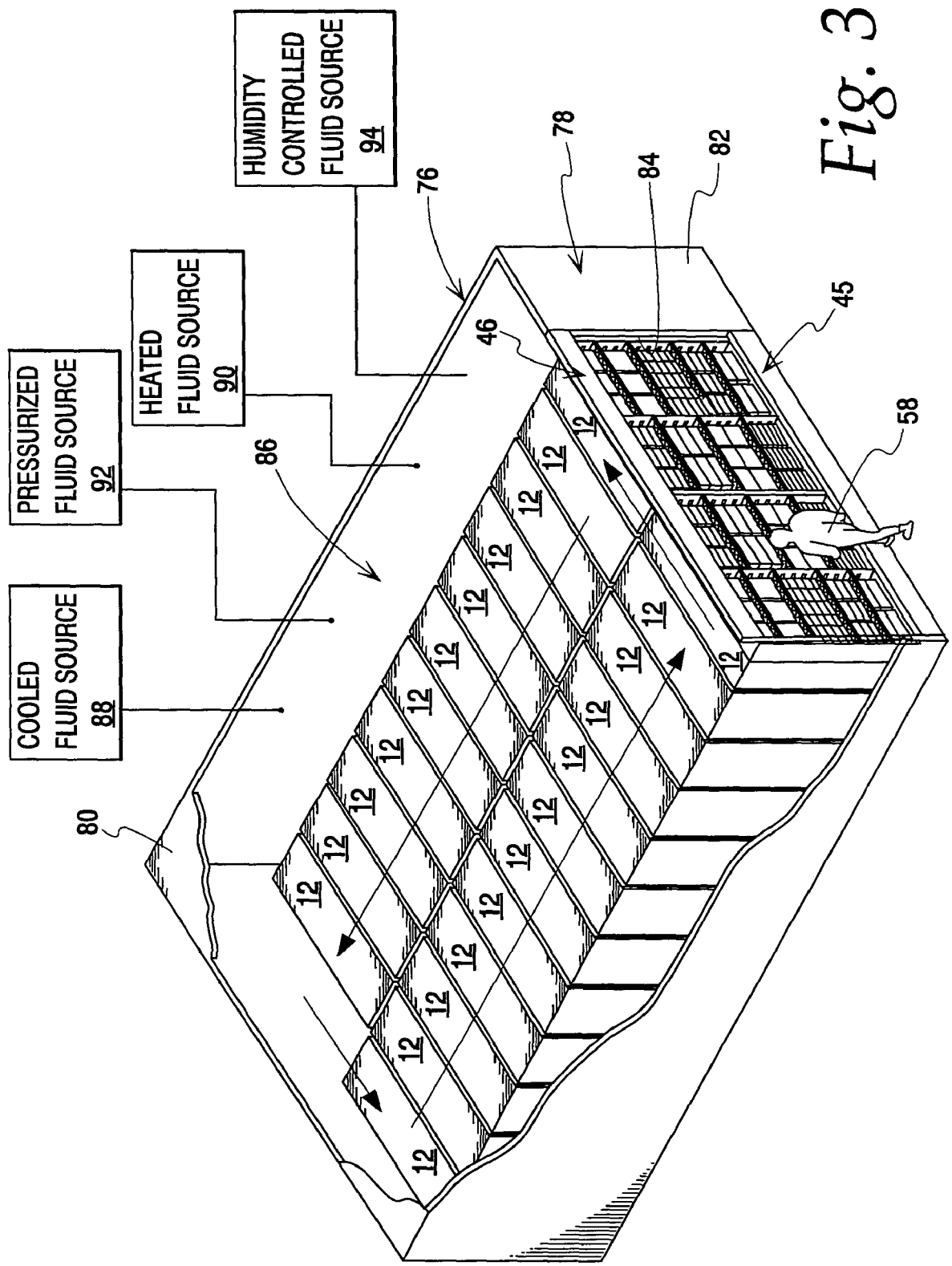
FIG. 3 is a view as in FIG. 1 and with a wall system incorporated to create a space, within which the shelf units reside, that is environmentally controlled.

Another aspect of the inventive system is its ability to support product on the shelf units 12 in a controlled environment, which may be harsh, without having to fully expose the operator 58 thereto. More specifically, as shown in FIG. 3, a wall structure at 76 is provided around the array of shelf units 12, shown in FIGS. 1 and 2, including the support/drive mechanism 45 therefor. The wall structure 76 consists of a peripheral wall 78 that is spanned by a top wall 80. A front wall portion 82 on the peripheral wall 78 has an opening 84 through which product can be picked from the shelf units 12 that reside adjacent to the front walls at the pick position 46. The opening 84 is configured to expose all of the vertically spaced shelves 52 in a column so that produce can be picked from any of the containers thereon.

The wall structure 76 performs multiple purposes. First of all, it provides an additional barrier against theft from the shelf units 12. More significantly, it creates a space 86, within which the shelf units 12 reside, which can be environmentally controlled. More specifically, one or more of a) a cooled fluid source 88, a heated fluid source 90, a pressurized fluid source 92, and a humidity controlled fluid source 94 can be placed internally of, or externally to, the space 86 to selectively control at least one of temperature, pressure and humidity within the environment. For example, the cooled fluid source 88 could be utilized to create a below-freezing environment for food products, or the like.

By reason of the wall structure 76, the operator 58 does not have to become fully immersed within the space 86 to access product in the shelf units 12. Instead, the conditioned air is retained substantially within the space 86, while access can be gained to product on the shelf unit 12 at the pick position 46 through the wall opening 84. The operator 58 is thus allowed to function in a comfortable environment while picking product, regardless of the environment within the space 86.

Figure 4:
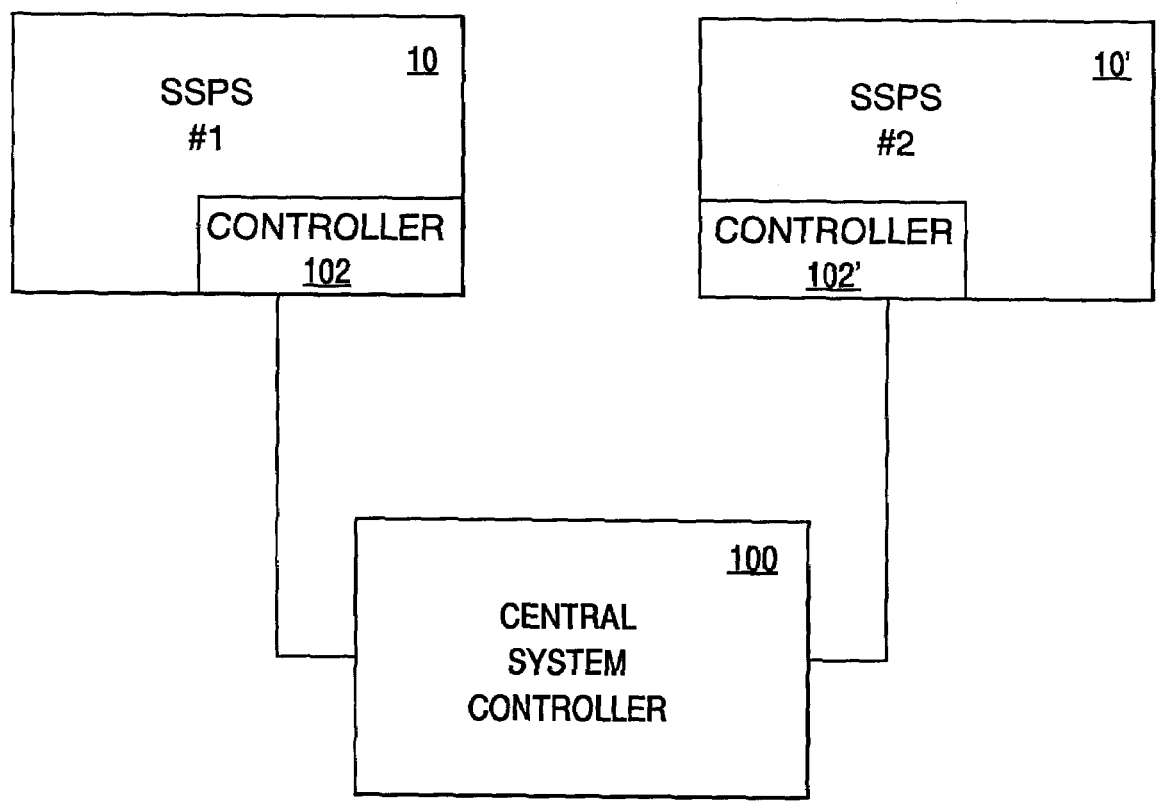
FIG. 4 is a schematic representation of two product storage and picking systems, as in FIG. 1, coordinated in operation through a central system controller.

The detailed operation of the system 10 will now be described to perform a combined process of batch picking and order consolidation. As shown in FIG. 4, operation of the system 10 can be coordinated with a similar system 10' through a central system controller 100. Each of the systems 10, 10' has its own associated controller 102, 102', respectively.

Figure 5:
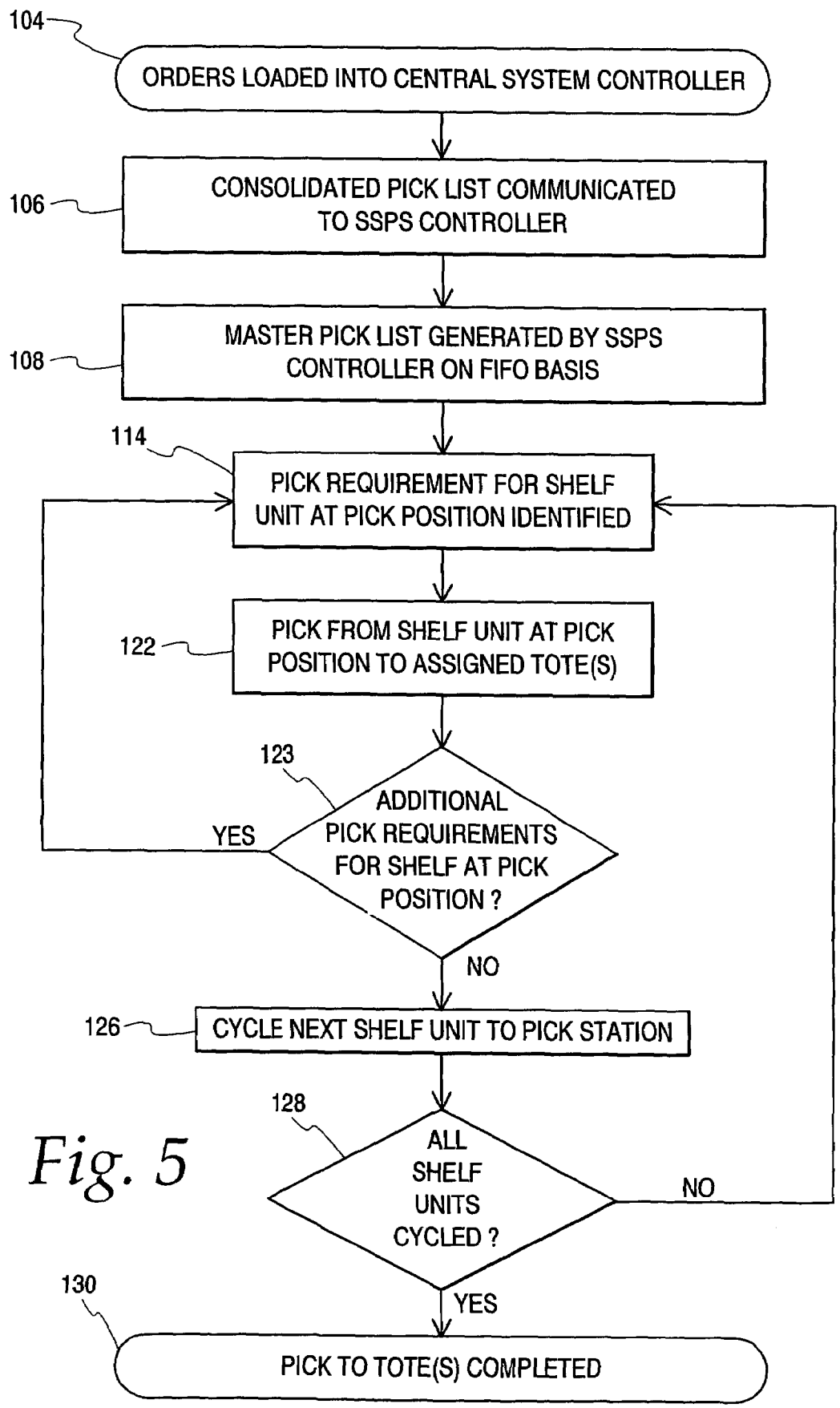
FIG. 5 is a flow diagram representation of a method for processing an order using the inventive product storage and picking system shown in FIGS. 1-4.
Figure 6:
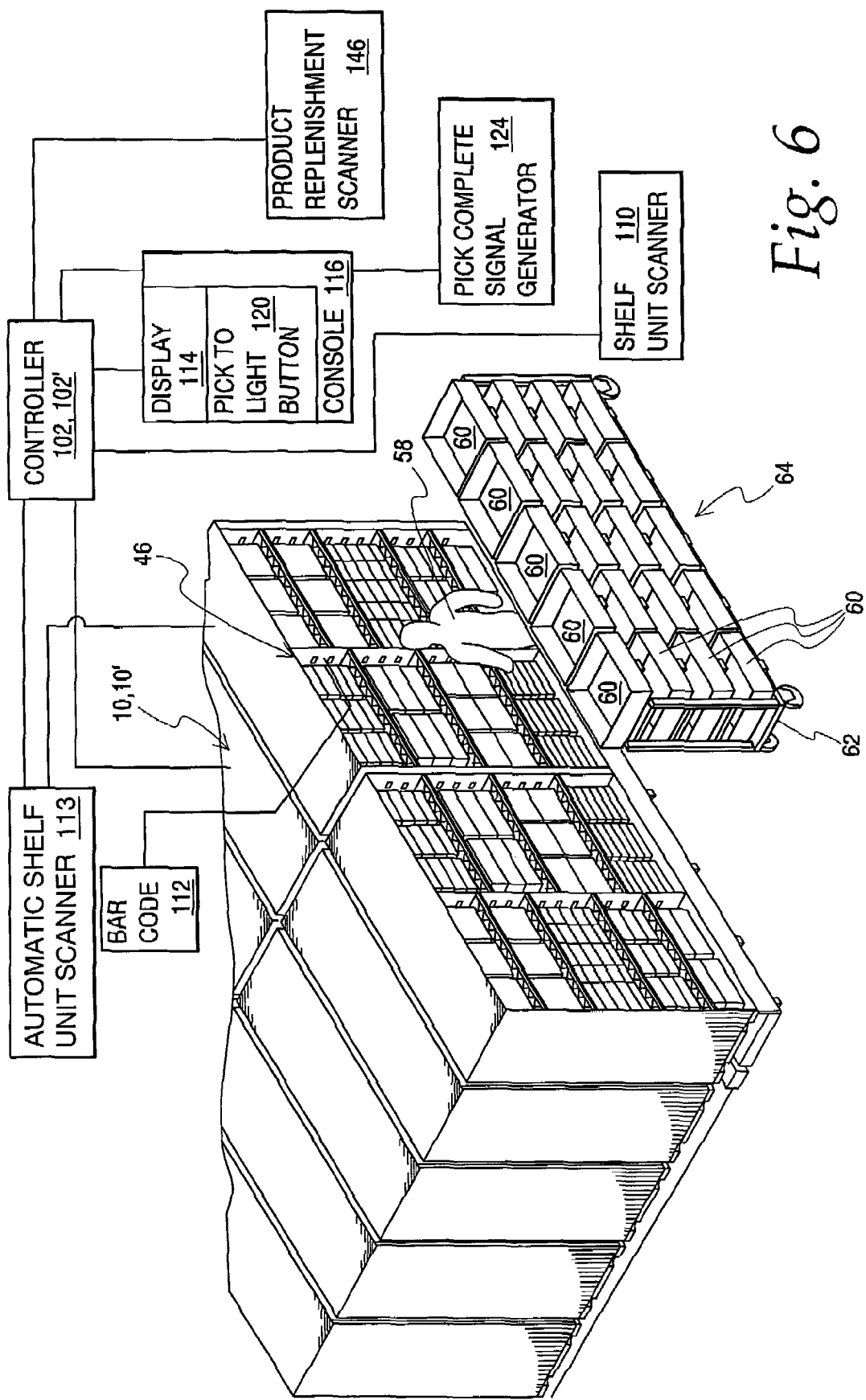
FIG. 6 is a fragmentary, partially schematic representation of a loading region of the product storage and picking system in FIGS. 1 and 2 during a product picking operation.

The operation of each of the systems 10, 10' is depicted in flow diagram form in FIG. 5. Orders to be processed are loaded into the central system controller 100, as shown at block 104. A consolidated pick list is communicated to each of the controllers 102, 102', as indicated at block 106. The consolidated pick list is processed by each of the controllers 102, 102' to generate a master pick list to identify products picks for each of the shelf units 12, on a first-in-first-out basis, as shown at block 108. Once the master pick list is generated, the pick cycle can be initiated by the operator 58, as shown in FIG. 6, taken in conjunction with FIG. 5. Once the master pick list is generated, all the picks for the shelf units 12 are predetermined. The operator 58, through a shelf unit scanner 110, identifies the shelf unit 12 at the pick position 46. The shelf unit scanner 110 may be, for example, a scanner for a bar code identification 112 on the shelf unit 12. Alternatively, the shelf unit 12 at the pick position can be identified automatically by a scanner 113. Once the scanning is carried out, the information from the master pick list is processed to display the pick requirements for the shelf unit, as indicated at block 114 in FIG. 5. The SKU, shelf location, and total pick quantity of the first item to be picked from that shelf unit 12 may be identified on a display 114 on a console 116. The operator then picks the identified quantity of the products from the shelf unit 12 at the pick position 46 and places the same in the appropriate order tote/container 60 on the cart 62 at the accumulation location 64. The appropriate number of products could potentially be identified alternatively using a pick to light button 120 on the console 116. The pick step is identified at block 122 in FIG. 5. A verification product scan may be carried out by the operator 58 to assure accuracy.

As indicated at block 123, the system then identifies whether additional picks are required for the shelf unit 12 at the pick position 46. This step could also be performed manually by the operator 58. If the response to the query is "yes", the process is repeated beginning with the step in block 114. If the answer to the query is "no", the operator 58 activates a pick complete signal generator 124, which communicates to the controller 102, 102' to incrementally change the cycle. This incremental change causes the next shelf unit 12 to be moved to the pick position 46, as heretofore explained. This cycling step is indicated at block 126 in FIG. 5. In block 128, it is determined if all shelf units 12 have been cycled. If the answer to the query is "no", the process returns to the step in block 114. If the answer to the query is "yes", the pick to totes process is completed, as indicated at block 130. The consolidation cart 62 can then be emptied and re-loaded to accommodate the next batch of orders.

Figure 7:
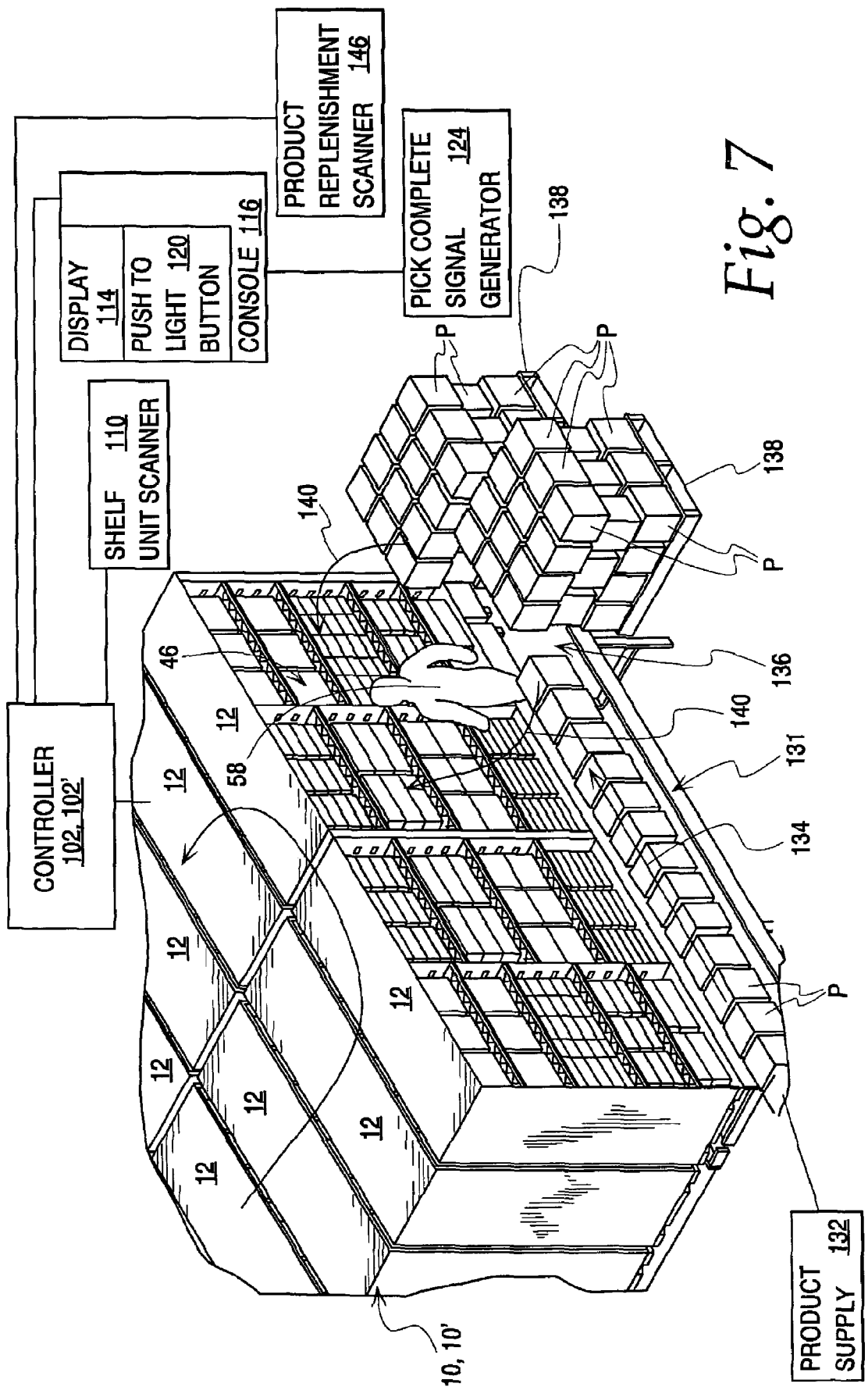
FIG. 7 is a view as in FIG. 6 with the product being replenished in the product storage and picking system.
Figure 8:
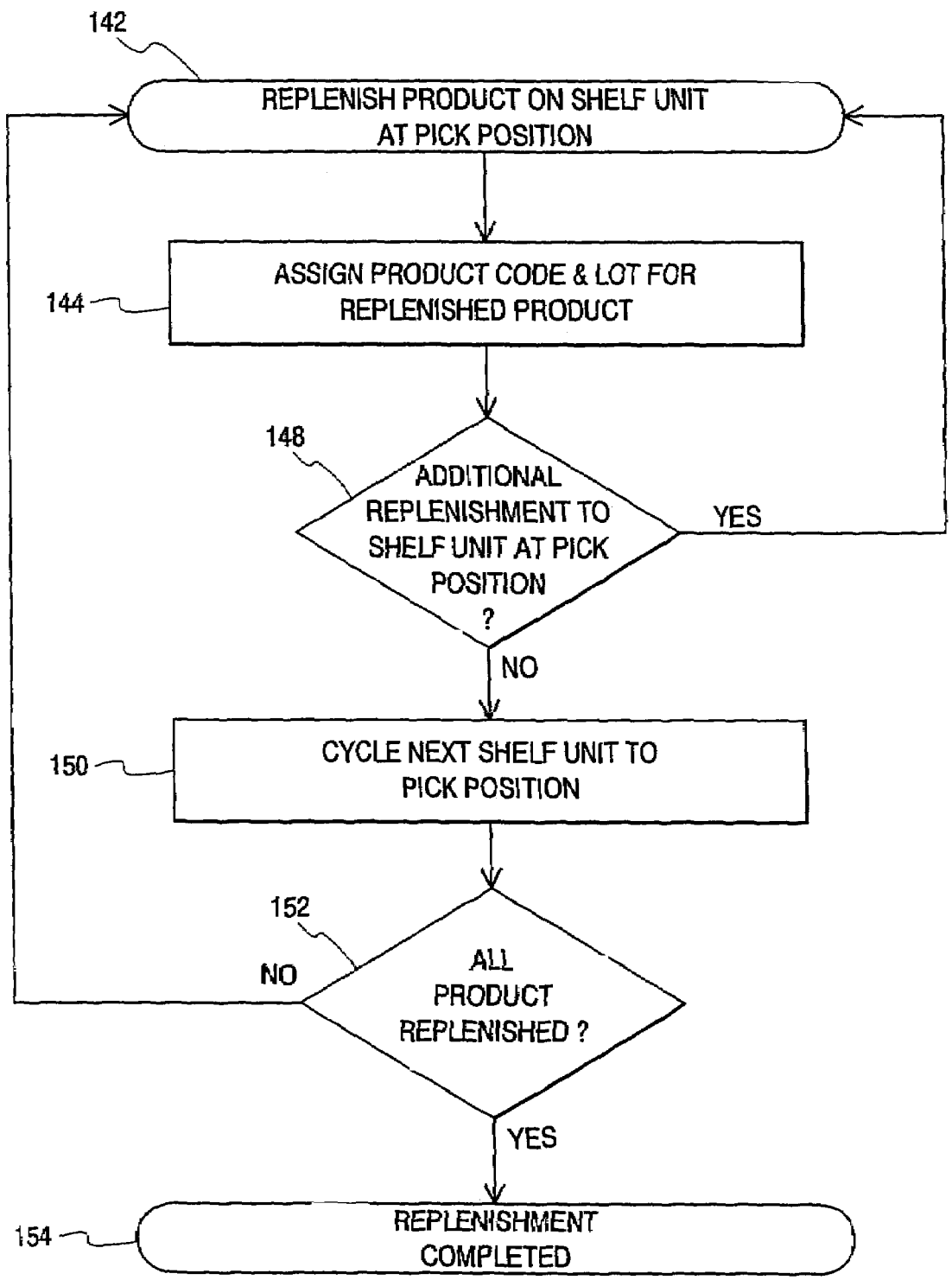
FIG. 8 is a flow diagram representation of a process for replenishing product in the product storage and picking system, according to the present invention.

The invention is also directed to method of replenishing product P on the shelf units 12, as shown in FIG. 7 and in flow diagram form in FIG. 8. The product P can be delivered to each of the systems 10, 10' in different fashions. The product P can be delivered as through a roller conveyor at 131, continuously from a supply 132 thereof, in a flow direction indicated by the arrow 134 to the front region 136 adjacent to the pick position 46 . The product P could alternatively be delivered in bulk as on pallets 138 to the same region 134, or manually brought in, as by the operator 58.

The product P is preferably delivered in SKU groups and put away by the operator 58 from the conveyor 131 and/or pallets 138, as indicated by the arrows 140, into the shelf units 12 in the order in which they arrive at the region 136. Even though particular SKU's may exist somewhere in the system 10, 10', it is not necessary to place the new product supply with the product already on the shelf units 12 together. In fact, it is desirable that new product be placed at a different location using a "random putaway process" so that lots are not mixed, thereby readily permitting product P to ultimately be picked on a first-in-first-out basis. As a result, the system automatically and continuously cleans itself at multiple locations. The replenishment cycle is similar to an order batch pick cycle, previously described, but performed in reverse.

As shown in FIG. 8, product P is replenished on the shelf unit 12 at the pick position 46, as shown at block 142. At the time this occurs, the operator 58 assigns a product code and lot to that particular shelf location, as shown at block 144. This can be accomplished by scanning bar codes using a product replenishment scanner 146.

As shown at block 148, a query is submitted as to whether additional replenishment to the shelf unit 12 at the pick position 46 is required. If the answer to the query is "yes", the replenishment process proceeds, starting again at the block 142. If the answer to the query is "no", the controller 102, 102' is operated, as shown at block 150, to cause the shelf units 12 to cycle to place the next shelf unit at the pick position 46.

A query is then submitted, as shown at block 152, regarding whether all product has been replenished. If the answer to the query is "no", the process proceeds again from the step in block 142. If the answer to the query in block 152 is "yes", the replenishment process is completed, as indicated at block 154.

The cycling of the shelf units 12 can be accomplished by myriad different mechanisms, that can be easily devised by those skilled in the art with an understanding of the desired cycle pattern for the shelf units 12. One exemplary support/drive mechanism 45 for accomplishing this is shown in FIGS. 9-12. It should be understood that the cycle direction could be reversed from that previously described with respect to FIG. 2. This reverse cycle direction will be described with respect to FIGS. 9-12. The support/drive mechanism 45 consists of a frame 156 which defines four guide rails/rail assemblies 160, 162, 164, 166 extending in spaced, parallel, relationship between the front 42 and rear 44 of the systems 10, 10' in between transition assemblies 168, 170, respectively at the front 42 and rear 44 of the systems 10, 10'.

Each of the guide rail assemblies 160, 162, 164, 166 may have the same construction. The exemplary guide rail assembly 160 cooperates with each shelf unit 12 to guide the shelf units 12 consistently in a fore-and-aft direction. The guide rail assembly 160 has an endless member 172 with separately projecting dogs 174, which are spaced to each engage with one of the shelf units 12 in the row 40. The endless member 172, and others described below, may be a chain with joined links or a continuous flexible element. A forwardly offset, rearwardly facing wall surface 176 is provided on the rear of each shelf unit 12 to be engaged by a forwardly moving dog 174. The dog 174 is guided through a V-shaped entryway 178 to against the surface 176. Each dog 174 nests in a receptacle 180 defined cooperatively by converging surfaces 182, 184, defining the entryway 178, and the surface 176. This arrangement prevents sideways shifting between the dogs 174 and shelf units 12 and accounts for a positive, aligned conveyance of shelf units 12 from rear to front during cycling.

Advancement of the endless member 172 is effected by a first drive 186, which causes the dogs 174 to advance in a forward direction, as indicated by the arrow 191 in the upper portion of their path wherein they engage the shelf the units 12. The forwardmost dog 174 advances the forwardmost shelf unit 12 into the open position at the X location (FIG. 2) to the point that the shelf unit 12 abuts to a front limiting wall 188 on the support/drive mechanism 45. In this position, the shelf unit 12 is "floating" upon an array of roller bearings 190 on the transition assembly 168.

Figure 9:
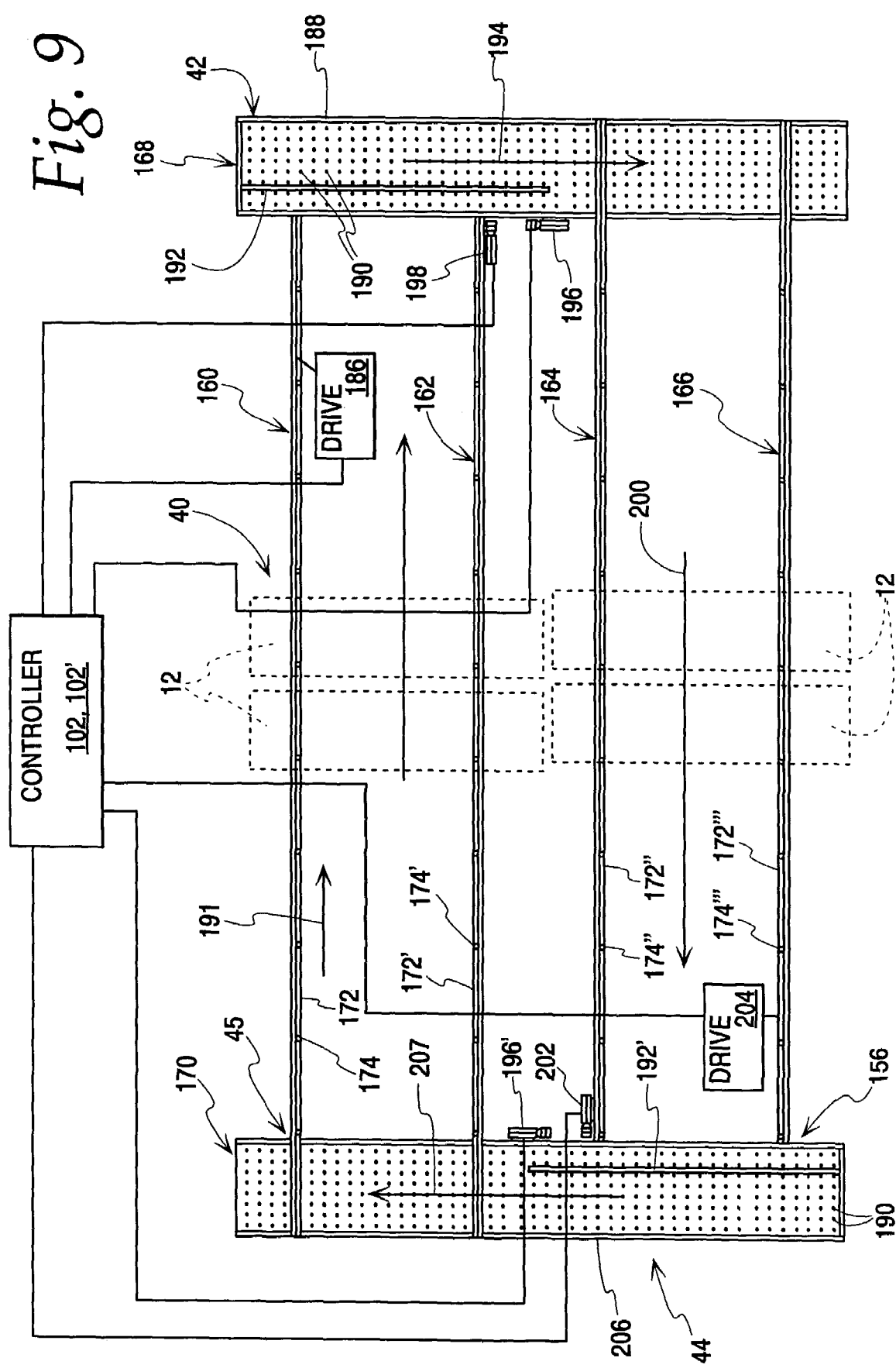
FIG. 9 is a plan view of a support/drive mechanism for repositioning shelf units on the inventive product storage and picking system.
Figure 10:
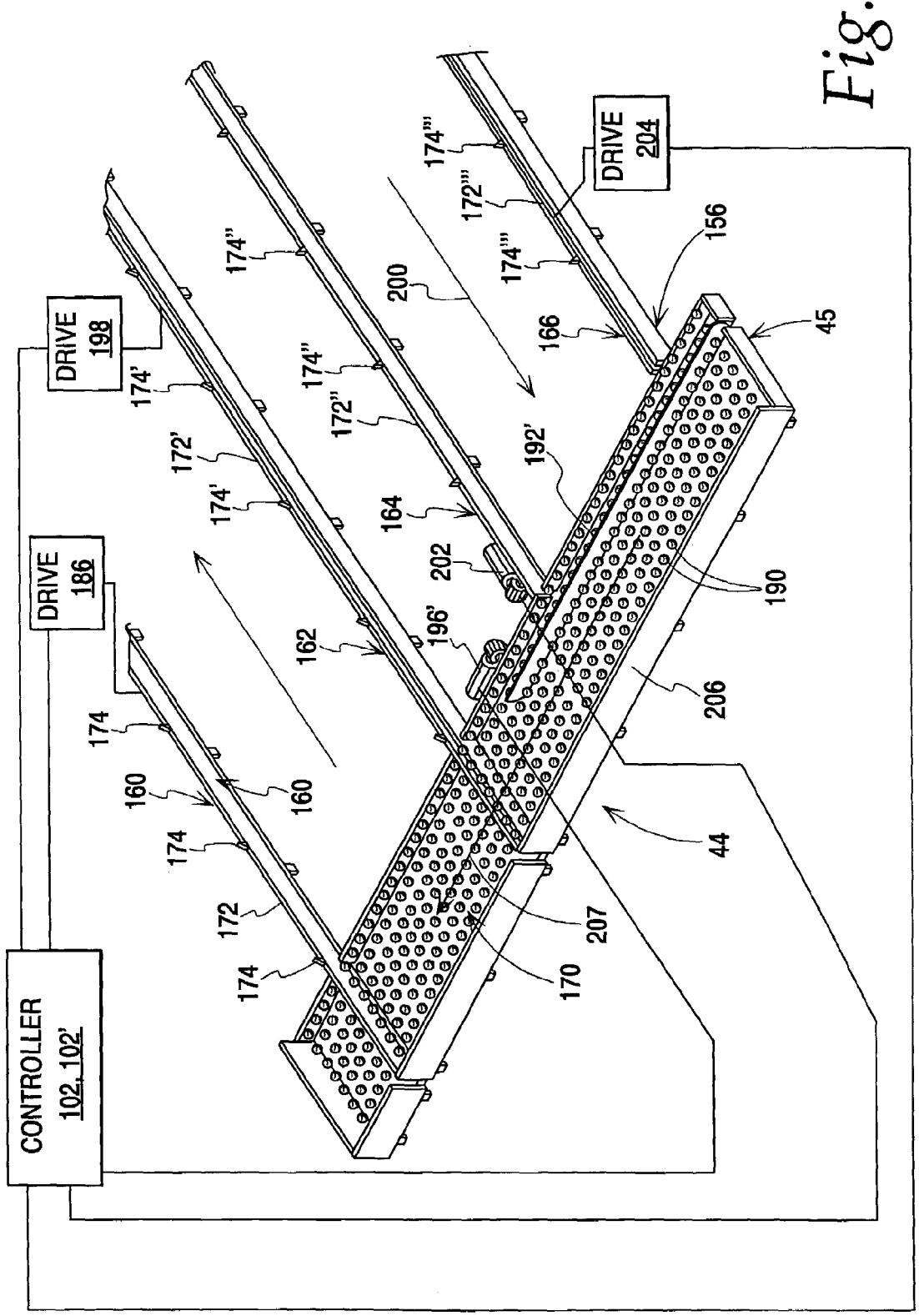
FIG. 10 is an enlarged, fragmentary, perspective view at the rear end of the support/drive mechanism in FIG. 9.

An endless member 192 with at least one drive dog 193 thereon, interacts through a sideways opening receptacle 180', having the same construction as the receptacle 180, with the shelf unit 12 at the X location and moves the same into the A location, as indicated by the arrow 194 in FIG. 9, when operated by a drive 196. A single endless member 184 may be sufficient to effect this incremental sideways movement, as only a single shelf unit 12 is being repositioned while the remaining shelf units 12 remain stationary. Preferably, a second endless member 172', with dogs 174' thereon, is provided in association with the guide rail 162 to function in unison with the endless member 172 and dogs 174 thereon to cooperatively advance the entire row of shelf units 14 in the row 40 forwardly to move the forwardmost shelf unit in the W position in the row 40 into the open position at the X location. A separate drive 198 may be utilized to advance the endless member 172'.

The rails 164, 166 have endless members 172", 172''' and dogs 174", 174''' carried thereby, and corresponding in function to the previously mentioned endless members 172, 172' and dogs 174, 174', to advance the shelf units 12 in the row 38 in unison rearwardly, in the direction of the arrow 200, to the open position at the L location. Separate drives 202, 204 are provided for the endless members 172", 172'''.

The transition assembly 170 at the rear 44 of the system 10, 10' has the same construction as the transition assembly 168. That is, roller bearings 190 support the shelf unit 12 at the L location with that shelf unit 12 abutted to a rear limiting wall 206 to allow the same to be driven through dogs 193' on an endless member 192' sideways, in the direction of the arrow at 207, to the open position at the M location. The endless member 192' is operated by a drive 196'.

In response to the operating signal to the controller 102, 102', initiated by the pick complete signal generator 124, the sequence of operation occurs as follows, starting from the FIG. 2 state. Initially, the drive 196' is operated to drive the shelf unit 12 in the L location into the open position at the M location. Thereafter, the drives 202, 204 are operated to shift the shelf units 12 at the A-K locations to the open position at the L location. Thereafter the drive 196 is operated to shift the shelf unit 12 in the X location sideways into the open position at the A location. This creates an open position at the X location, which is the pick position 46. The drives 186, 198 are then operated to shift the shelf units 12 at the M-W locations to the open position at the X location. The cycle is thereby completed and the configuration of the system as shown in FIG. 2 is re-established.

Again, it should be emphasized that the construction for the support/drive mechanism shown in FIGS. 9-12 is only exemplary in nature. Other potentially radically different designs are contemplated which allow the desired cycling pattern for the shelf units 12. As just examples, many different guide rail designs could be utilized ranging from one having a single guide rail assembly for each path portion to one having more than two. The number and types of drives may be changed from what is shown and described.

Further, while the individual drives 186, 196, 196', 198, 202, 204, are shown to be within the conditioned space 86, these drives could be located outside of the space 86, or could be effectively insulated from the potentially harsh conditions within the space 86 at the depicted location beneath the shelf units 12. The drives 186, 196, 196', 198, 202, 204 could be electrically or hydraulically operated.

While the system 10 has been described above to be operable in batch picking operations, the system 10 could also be used for discrete order picking, whereby the system 10 is cycled to fill a single order. Generally, however, the system 10 will be more efficient, from a time standpoint, for batch picking rather than discrete order picking. However, with slow moving product, it may be feasible to use the inventive system 10 for discrete order picking.

The foregoing disclosure of specific embodiments is intended to be illustrative of the broad concepts comprehended by the invention.

The invention claimed is:

1. A product storage and picking system comprising:
a plurality of shelf units each having a front, a rear, a top, a bottom and spaced sides,
the plurality of shelf units arranged in first and second side-by-side rows with the shelf units in each of the first and second rows having an orientation and arranged in front-to-rear relationship,
the plurality of shelf units movable guidingly in a cycle to selectively place each of the shelf units serially at a pick position so that product on the shelf unit at the pick position can be removed to fill an order,
at least one of the shelf units movable in a predetermined manner during a portion of the cycle without changing the orientation of the at least one of the shelf units and without moving other shelf units in the plurality of shelf units.

2. A product storage and picking system comprising:
a plurality of shelf units each having a front, a rear, a top, a bottom and spaced sides,
the plurality of shelf units arranged in first and second side-by-side rows with the shelf units in each of the first and second rows arranged in front-to-rear relationship,
the plurality of shelf units movable guidingly in a cycle to selectively place each of the shelf units serially at a pick position so that product on the shelf unit at the pick position can be removed to fill an order,
at least one of the shelf units movable in a predetermined manner during a portion of the cycle without moving other shelf units in the plurality of shelf units,
wherein the at least one shelf unit translates in a sideways linear path as the at least one shelf unit moves in the predetermined manner during the portion of the cycle.

3. A product storage and picking system comprising:
a plurality of shelf units each having a front, a rear, a top, a bottom and spaced sides,
the plurality of shelf units arranged in first and second side-by-side rows with the shelf units in each of the first and second rows arranged in front-to-rear relationship,
the plurality of shelf units movable guidingly in a cycle to selectively place each of the shelf units serially at a pick position so that product on the shelf unit at the pick position can be removed to fill an order,
at least one of the shelf units movable in a predetermined manner during a portion of the cycle without moving other shelf units in the plurality of shelf units,
the product storage and picking system further comprising a wall structure defining a space within which the plurality of shelf units reside and there is an opening in the wall structure at the pick position communicating to externally of the space.

4. The product storage and picking system according to claim 3 wherein the space within the wall structure is environmentally controlled.

5. A product storage and picking system comprising:
a plurality of shelf units each having a front, a rear, a top, a bottom and spaced sides,
the plurality of shelf units arranged in first and second side-by-side rows with the shelf units in each of the first and second rows arranged in front-to-rear relationship,
the plurality of shelf units movable guidingly in a cycle to selectively place each of the shelf units serially at a pick position so that product on the shelf unit at the pick position can be removed to fill an order,
at least one of the shelf units movable in a predetermined manner during a portion of the cycle without moving other shelf units in the plurality of shelf units,
wherein the plurality of shelf units have flat sides and flat sides on shelf units in the first row reside in adjacent parallel relationship to flat sides on shelf units in the second row.

6. The product storage and picking system according to claim 5 wherein the plurality of shelf units are arranged so that there is at least one open position into which a shelf unit can shift during the cycle.

7. The product storage and picking system according to claim 6 wherein a single shelf unit is shifted sideways into the one open position during the cycle.

8. The product storage and picking system according to claim 6 wherein all of the shelf units in the first row are shifted in one of a) a rear-to-front and b) front-to-rear direction to thereby move a shelf unit into the one open position during the cycle.

9. The product storage and picking system according to claim 7 wherein the product storage and picking system comprises a dog moved by an endless member for engaging the single shelf unit and shifting the single shelf unit sideways into the one open position.

10. The product storage and picking system according to claim 8 wherein the product storage and picking system comprises a dog moved by an endless member for engaging one of the shelf units in the first row and shifting all of the shelf units in the first row to thereby move a shelf unit into the one open position during the cycle.

11. A product storage and picking system comprising:
a plurality of shelf units each having a front, a rear, a top, a bottom and spaced sides,
the plurality of shelf units arranged in first and second side-by-side rows with the shelf units in each of the first and second rows arranged in front-to-rear relationship,
the plurality of shelf units movable guidingly in a cycle to selectively place each of the shelf units serially at a pick position so that product on the shelf unit at the pick position can be removed to fill an order,
at least one of the shelf units movable in a predetermined manner during a portion of the cycle without moving other shelf units in the plurality of shelf units,
the product storage and picking system further comprising at least a first rail for guiding movement of the shelf units in the first row in a substantially linear first path and at least a second rail for guiding movement of the shelf units in the second row in a substantially linear second path that is substantially parallel to the first path.

12. The product storage and picking system according to claim 7 wherein the product storage and picking system further comprises a plurality of ball bearings which guide shifting of the single shelf unit sideways from one of the first and second rows into the other of the first and second rows.

13. A product storage and picking system comprising:
a plurality of shelf units each having a front, a rear, a top, a bottom and spaced sides,
the plurality of shelf units arranged in first and second side-by-side rows with the shelf units in each of the first and second rows arranged in front-to-rear relationship,
the plurality of shelf units movable guidingly in a cycle to selectively place each of the shelf units serially at a pick position so that product on the shelf unit at the pick position can be removed to fill an order,
at least one of the shelf units movable in a predetermined manner during a portion of the cycle without moving other shelf units in the plurality of shelf units,
the product storage and picking system further comprising a drive system comprising a plurality of drive assemblies, and a control system for coordinatingly operating the drive assemblies to cause the shelf units to move in the cycle.

14. The product storage and picking system according to claim 13 wherein the plurality of shelf units are arranged so that there is at least one open position into which a shelf unit can be positioned, the drive system comprises a) a first drive assembly that is operable to shift a single shelf unit from the first row sideways into the one open position in the second row thereby creating an open position in the first row and b) a second drive assembly that is operable to shift the shelf units in the first row in one of a front-to-rear and rear-to-front direction to cause a shelf unit in the first row to move into the open position in the first row.

15. A product storage and picking system comprising:
a plurality of shelf units each having a front, a rear, a top, a bottom and spaced sides,
the plurality of shelf units arranged in first and second side-by-side rows with the shelf units in each of the first and second rows arranged in front-to-rear relationship,
the plurality of shelf units movable guidingly in a cycle to selectively place each of the shelf units serially at a pick position so that product on the shelf unit at the pick position can be removed to fill an order,
at least one of the shelf units movable in a predetermined manner during a portion of the cycle without moving other shelf units in the plurality of shelf units,
wherein the product storage and picking system further comprises a control system, the control system capable of receiving an order for product and processing the order for product by generating a pick list through which products in the order for product are serially identified to an operator at the shelf units at the pick position as the shelf units are moved during the cycle.

16. A product storage and picking system comprising:
a plurality of shelf units each having a front, a rear, a top, a bottom and spaced sides,
the plurality of shelf units arranged in first and second side-by-side rows with the shelf units in each of the first and second rows arranged in front-to-rear relationship,
the plurality of shelf units movable guidingly in a cycle to selectively place each of the shelf units serially at a pick position so that product on the shelf unit at the pick position can be removed to fill an order,
at least one of the shelf units movable in a predetermined manner during a portion of the cycle without moving other shelf units in the plurality of shelf units,
wherein the plurality of shelf units are arranged in a squared array as viewed from above.

17. The product storage and picking system according to claim 16 wherein the squared array is bounded by a squared edge including parallel side edge portions and parallel front and rear edge portions, the fronts and rears of the plurality of shelf units are flat and substantially parallel to the front and rear edge portions and the sides of the plurality of shelf units are flat and substantially parallel to the side edge portions.

18. The product storage and picking system according to claim 4 further comprising a source of at least one of: a) cooled fluid; b) heated fluid; c) pressurized fluid; and d) humidity controlled fluid to environmentally control the space.

19. The product storage and picking system according to claim 3 wherein the wall structure closely surrounds the plurality of shelf units and blocks access to product on the shelf units at other than at least one discrete opening in the wall structure.

20. A product storage and picking system comprising:
a plurality of shelf units each having a front, a rear, a top, a bottom and spaced sides; and
a wall structure bounding a space within which the plurality of shelf units reside,
the wall structure blocking access to product on the shelf units and having an opening,
the plurality of shelf units movable guidingly in a cycle to selectively place each of the shelf units serially at a pick position so that product on the shelf unit at the pick position can be accessed through the wall structure opening and removed to fill an order,
wherein the plurality of shelf units are arranged in a squared array as viewed from above.

21. The product storage and picking system according to claim 20 wherein the squared array is bounded by a squared edge including parallel side edge portions and parallel front and rear edge portions, the fronts and rears of the plurality of shelf units are flat and substantially parallel to the front and rear edge portions and the sides of the plurality of shelf units are flat and substantially parallel to the side edge portions.

22. A product storage and picking system comprising:
a plurality of shelf units each having a front, a rear, a top, a bottom and spaced sides; and
a wall structure bounding a space within which the plurality of shelf units reside,
the wall structure blocking access to product on the shelf units and having an opening,
the plurality of shelf units movable guidingly in a cycle to selectively place each of the shelf units serially at a pick position so that product on the shelf unit at the pick position can be accessed through the wall structure opening and removed to fill an order,
the product storage and picking system further comprising a control system, the control system capable of receiving an order for product and processing the order for product by generating a pick list through which products in the order for product are serially identified to an operator at the shelf units at the pick position as the shelf units are moved during the cycle.

* * * * *